Feb. 26, 1935. G. GRANDJEAN 1,992,697
JOURNAL BOX
Filed July 24, 1930 3 Sheets-Sheet 2

Inventor
Georges Grandjean,
By O. P. Wochaupter
Attorney

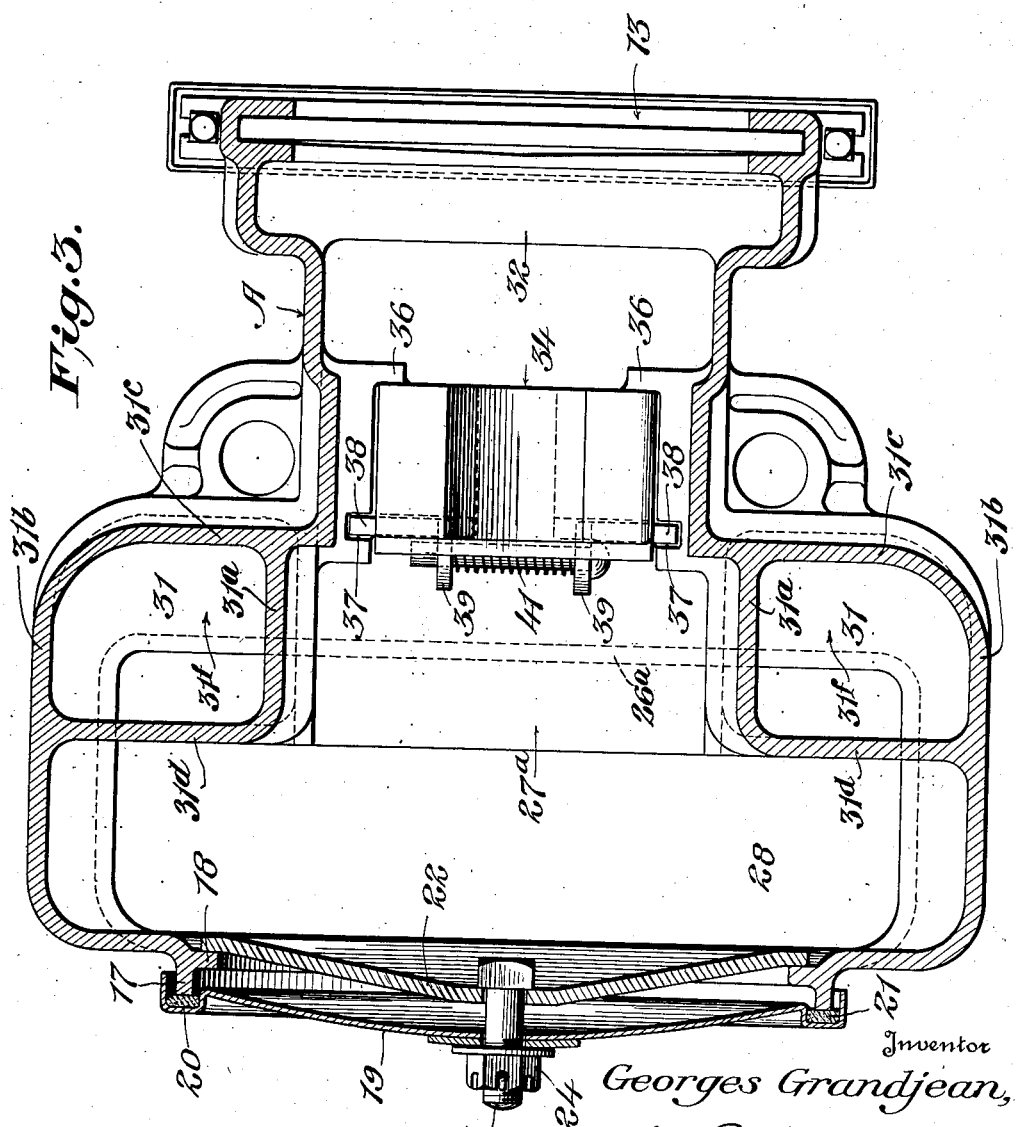

Patented Feb. 26, 1935

1,992,697

UNITED STATES PATENT OFFICE 1,992,697

JOURNAL BOX

Georges Grandjean, New York, N. Y., assignor to Isothermos Corporation of America, New York, N. Y., a corporation of Delaware Application July 24, 1930, Serial No. 470,523

15 Claims. (Cl. 308—83)

This invention relates to journal boxes of the general type in which lubrication of an associated axle journal and its bearing is adapted to be effected by means of a paddle or its equivalent mounted on the axle for rotation therewith so as to dip into oil contained in the journal box and thus deliver oil to the journal and the bearing.

Certain vehicles such, for example, as dump cars and the like are adapted in use to be tilted or even turned completely over, either endwise or laterally, and in this connection an object of the present invention is to provide, in a journal box of the type mentioned, improved means to retain the oil therein when the box is turned over, and to provide for immediate restoration of the original lubricating status of the box when same is righted following tilting or turning over thereof.

Another object of the invention is to provide an improved cover construction for the usual opening in the outer end of the box, said cover being adapted either by reason of its own inherent resiliency, or by reason of the inherent resiliency of an element of the means for securing the cover to the box, to assure at all times an oil tight seal to prevent escape of oil from the box and to prevent entrance of foreign matter into the box through the aforesaid opening in the box.

Another object of the invention is to provide means to prevent displacement of the wedge or the bearing, or both, not only in case of a vehicle being tilted or turned over as heretofore mentioned, but in any case of the journal box being subjected to a violent shock as, for example, in the case of rough shunting of cars or their derailment.

With the foregoing and other objects in view, the invention consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 3 is a horizontal section on the line 3—3 of Fig. 1, the axle being omitted.

Figure 1:
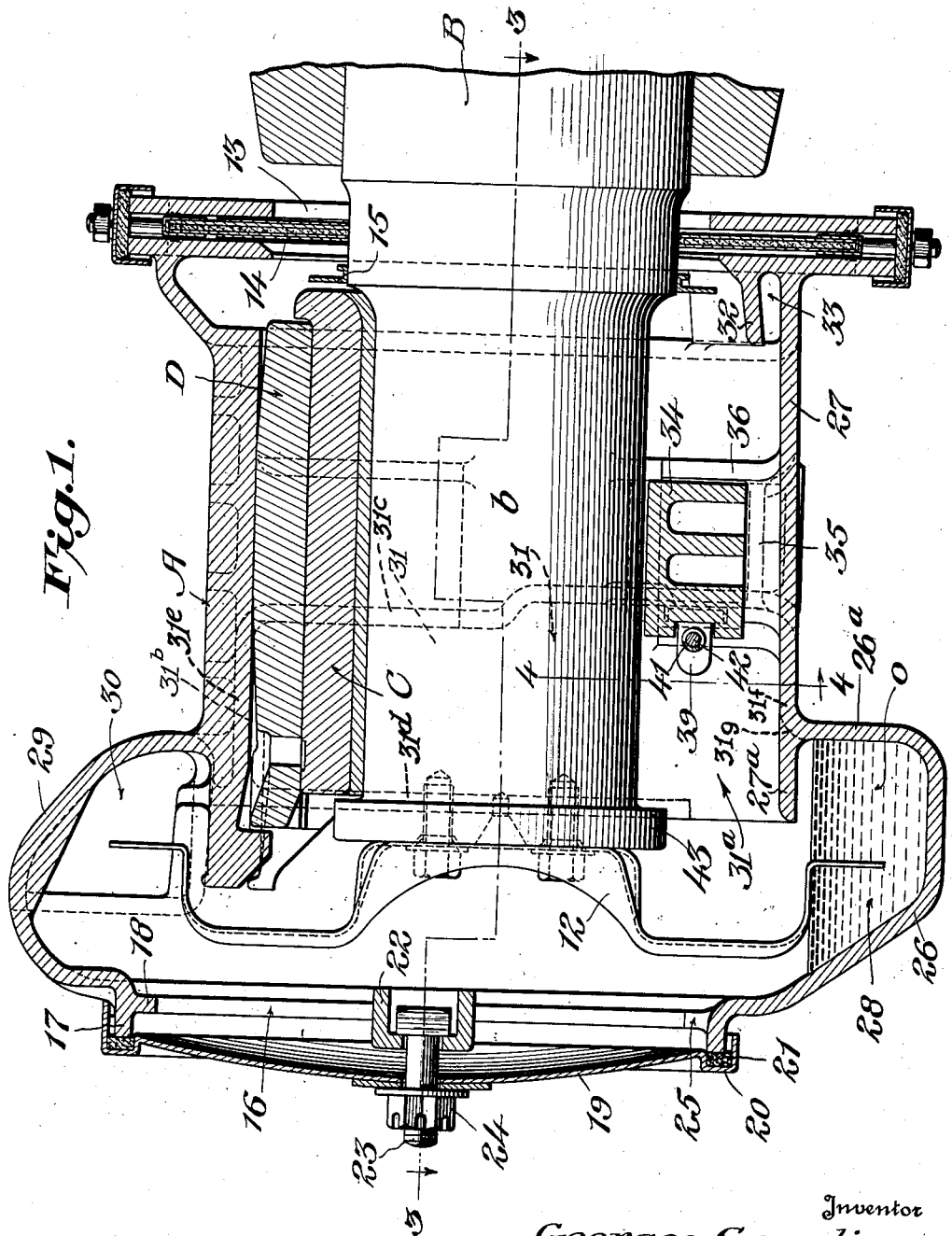
Figure 1 is a central, longitudinal section through a journal box constructed in accordance with the present invention.
Figure 2:
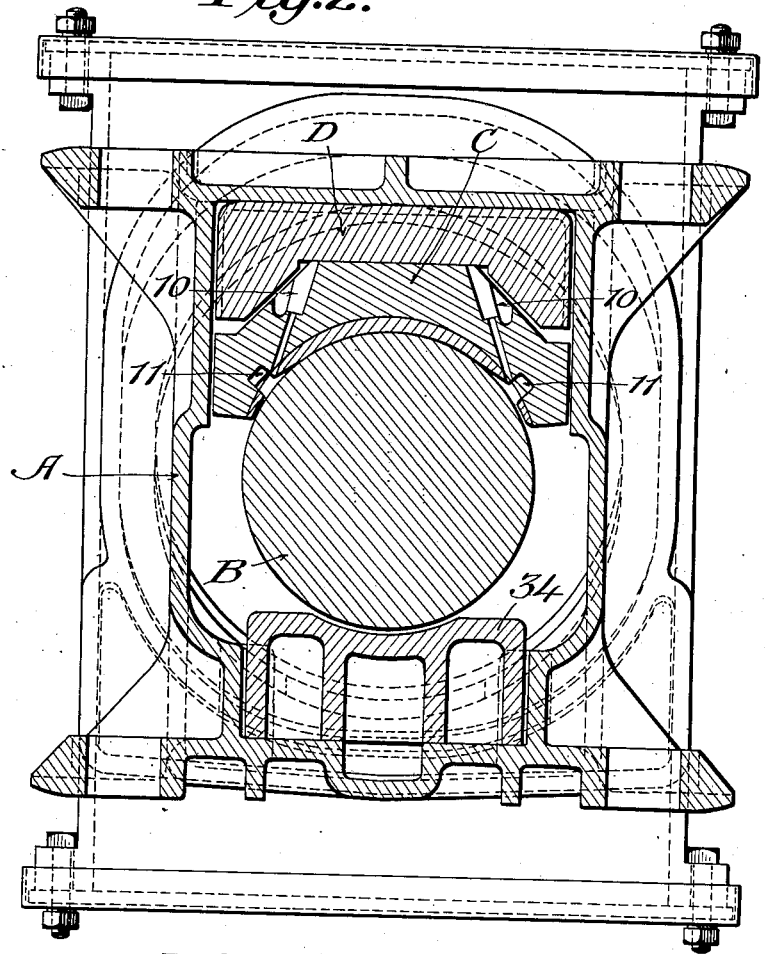
Figure 2 is a central, transverse section through the structure illustrated in Fig. 1.
Figure 4:
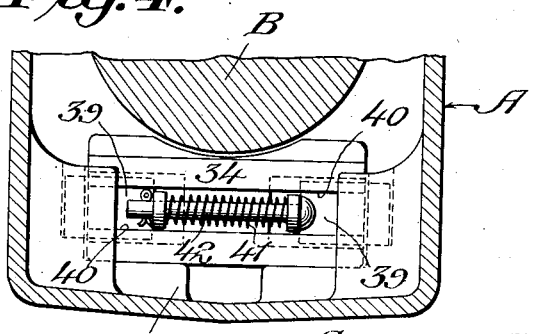
Figure 4 is a detail section on the line 4—4 of Fig. 1.

Referring to the drawings in detail, A designates generally the present journal box and B an associated axle, which latter is inclusive of a journal portion b seating against a bearing C which is operatively supported in the upper part of the journal box by means of a wedge D.

The bearing C is provided with suitable oil conducting channels 10 in its upper face and with oil distributing grooves or channels 11 in its lower face in communication with the channels 10, and a paddle or its equivalent, 12, is mounted on the end of the axle B for rotation therewith to dip into a body of oil o contained in the bottom of the journal box, thereby to elevate oil and deliver it to the channels 10 to effect lubrication of the bearing and the journal in a manner well known in the art.

At the rear of the journal box where the axle B extends through an opening 13 in the rear wall of the box, a suitable dust guard 14 is provided to surround the axle and to close said opening against the entrance of foreign matter therethrough into the box, while to prevent oil from creeping along the axle into contact with the dust guard 14, an obturating ring 15 of suitable design is mounted on the axle between the dust guard and the adjacent end of the bearing C.

At its outer end the box A is provided with an opening 16 to afford access to the interior of the box, and a feature of the present invention resides in the provision of a novel closure structure for this opening.

Formed integral with the body of the journal box and surrounding the opening 16 is an outwardly directed flange 17, while projecting inwardly from said flange 17 is a flange 18. The closure for the opening 16 is in the form of a cover plate 19 of relatively thin metal conforming in shape to the shape of the flange 17 and provided at its margin with a channel 20 containing a gasket 21 which seats against the outer edge of the flange 17. A clamp bar 22 for the cover plate 19 is provided to span the opening 16 and to seat at its ends against the inner face of the flange 18 at opposite sides of said opening, while extending outward from said clamp bar is a bolt or stud 23 which passes through a central opening in the cover plate and to the outside of the latter is equipped with a nut 24.

The cover plate 19 is inherently resilient and preferably is dished outwardly, whereby energy is stored therein when the nut 24 is tightened to maintain the gasket 21 constantly in oil tight sealing engagement against the flange 17. A gap 25 is formed at a suitable point in the flange 18 and when it is desired to remove the cover plate the nut 24 is simply loosened and the bar rotated by means of the bolt or stud 23 until one end of the bar alines with said gap, whereupon the cover plate and the bar may be removed as a unit from the box.

At its outer end the box A is extended downwardly as at 26 below the bottom wall proper 27 of the box to provide an oil well 28 in which the body of oil o normally is contained. In a similar manner the top of the box is extended upwardly at its outer end as at 29 to provide a well 30 to receive the oil o under certain conditions, when the box is inverted.

At the center of the box A the bottom wall 27 thereof is extended forwardly beyond the rear wall 26a of the well or reservoir 28 so as to overhang the inner end portion of said well or reservoir, as indicated at 27a, while at the sides of the box, rearwardly of the front wall thereof are formed vertically extending oil receiving chambers 31. Each chamber 31 comprises inner and outer side walls 31a, 31b, respectively, inner and outer end walls 31c, 31d, respectively, a top wall 31e, and a bottom wall 31f, and, as shown, the bottom wall 31f of each chamber is disposed in the present instance in the same plane as the main bottom wall 27 of the casing A. The said chamber bottom walls 31f may, however, be disposed above or even somewhat below the main bottom wall 27 of the casing, depending upon the normal level of the oil within the reservoir 28. In any event, said chamber bottom walls are disposed above the bottom wall of the reservoir 28 and at no lower elevation than the normal level of the oil within the reservoir, so that, normally, all of the oil is contained within the reservoir and the chambers 31 are empty. Moreover, the chamber bottom walls 31f terminate at their outer edges in the plane of the rear wall 26a of the reservoir and merge into said rear wall 26a as indicated at 31g. On the other hand, the outer end wall 31d of each chamber 31 terminates at its bottom suitably above the related bottom wall 31f so that each compartment 31 has, directly above its bottom wall 31f, an outer end opening affording communication at all times between the interior of the compartment and the oil reservoir 28. Furthermore, the forward extension or lip 27a extends transversely of the casing A from the inner side wall 31a of one of the chambers 31 to the inner side wall 31a of the other chamber.

Thus, if the journal box is inverted by rotation in a plane transverse to the axle B, the oil o simply will follow one or the other of the side walls of the box, depending upon the direction of rotation of the box, and will collect in the well 30 when the box is inverted. On the other hand, if the box is inverted by rotation thereof in a vertical plane which extends longitudinally with respect to the axle B, the oil either will follow the inner face of the cover plate 19 to the well 30, if the box is rotated counterclockwise as viewed in Fig. 1, or, if the box is rotated in a clockwise direction as viewed in said figure, the oil will be prevented by the overhanging lip portion 27a of the bottom of the box from entering the box proper below the journal b and the oil will flow into one or the other or both of the compartments 31 where it will be retained until the box during its rotation approaches its normal position. In any event, the arrangement obviously is such that irrespective of how the box may be tilted or turned the oil will be prevented from flowing rearwardly through the box and when the box is returned to a normal position the oil will return to the well 28.

The bottom wall proper 27 of the box A preferably slopes downwardly towards the well 28 so that any oil which may drip from the bearing and the journal onto said wall when the box is disposed in a normal position will be directed into said well 28, while at the rear of the box a lip 32 is provided to extend forwardly from the rear wall of the box in overhanging relation to the rear portion of the bottom wall 27 to prevent any oil which may be contained on the bottom wall 27 from reaching the dust guard 14 when the box is rotated in a clockwise direction as viewed in Fig. 1. In other words, the lip 32 cooperates with the rear and bottom walls of the box to provide a pocket 33 within which any slight amount of oil contained within the box proper may collect when the box is rotated as last mentioned.

As heretofore stated, a feature of the present invention resides in the provision of means to prevent displacement of the wedge D or the bearing B, or both, either due to tilting or rotation of the journal box or to the box being subjected to violent shocks.

The foregoing means consists essentially of a block 34 disposed between the underside of the journal b and the bottom wall 27 of the box A, whereby the box is held against upward movement relative to the axle and the axle is held against downward movement relative to the box, so that maintenance of the assembly of the bearing B and the wedge D between the upper side of the journal b and the top of the box is assured under all conditions.

The bottom wall 27 of the box is formed with an upwardly directed pedestal 35 of suitable height on which the block 34 rests, and the latter, which preferably is of hollow construction reinforced by suitable webs, is recessed in its upper face to receive the journal b.

At the rear the pedestal 35 is provided with inwardly directed flanges 36 which extend above said pedestal and against which the rear side of the block 34 abut whereby said block is held against rearward movement from its operative position on the pedestal, while at the front of the pedestal are formed vertically extending channels 37 to receive projections 38 which extend laterally from the block 34 whereby the block is held against forward movement from its operative position on the pedestal.

The projections 38 are constituted by the ends of a pair of L-shaped members 39 which are mounted for sliding movement in T-shaped slots 40 formed transversely across the front side of the block 34, said members 39 being projected normally outwardly relative to one another by a coil spring 41 disposed between said members on a pin 42 connecting said members, whereby the ends of the latter are releasably retained normally in the channels 37 and the block 34 thus is held in operative position beneath the journal.

The height of the block 34 is less than the distance between the lip 27a and the underside of the usual flange 43 at the end of the axle. Therefore, the block 34 is capable of being removed from its normal operative position through the space between said lip 27ª and said flange 43, in which connection it is obvious that while the members 39 serve normally to retain the block on the pedestal 35, said members 39 may be released from the channels 37 by simply moving said members relatively inward in any suitable manner and the block thereupon will be free to be withdrawn from beneath the journal b.

Obviously, instead of the cover plate 19 being resilient, said cover plate might be formed inherently rigid and the bar 22 might be resilient, or both said cover plate and said bar might be either resilient or rigid and in the latter event a spring might be employed between the nut 24 and the cover plate or between the bar 22 and the head of the bolt 23 to maintain the gasket 21 in sealing engagement with the flange 17. In addition, various other modifications within the spirit and scope of the invention may suggest themselves to persons skilled in the art.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In combination, a journal box, a bearing in the top of said box, an axle journaled against said bearing, a block interposed between the bottom of the box and the underside of the axle, abutment means limiting rearward movement of the block, the box being provided with side recesses, a pair of members slidably carried by said block, and spring means between said members urging their outer end portions into said recesses.

2. In combination, a journal box, a bearing in the top of said box, an axle journaled against said bearing, a pedestal rising from the bottom of the box, abutment flanges at the rear of said pedestal, the box having side recesses at the front of said pedestal, a block mounted on said pedestal in front of said abutment flanges, a pair of members slidably mounted in the front of the block with their outer ends disposed in said recesses, and yieldable means holding said members engaged in said recesses.

3. In combination, a journal box, a bottom wall, a bearing in the upper part of the box, an axle journaled in the bearing, an oil reservoir formed below the bottom wall of said box, means for lifting oil contained in said reservoir to the bearing, and means providing chambers at the sides of the box, said chambers being closed at their sides and tops and having bottom walls no lower than the top of the reservoir and further having openings at their lower ends directly above their bottom walls providing constant communication between said chambers and said reservoir.

4. A journal box including a box casing formed with an oil reservoir, a bottom wall for said casing located above the reservoir and having a portion thereof overhanging the oil level of said reservoir, and means at the sides of the casing and located above said bottom wall to provide inverted chambers closed at their sides and tops and having open mouth portions lying at the top of said reservoir and at opposite sides of the said overhanging wall portion of the casing, the bottoms of said chambers being disposed above the bottom of the reservoir.

5. A tiltable journal box including a casing formed with an oil reservoir, a bottom wall located above and inclined toward the reservoir and having a portion overhanging said reservoir whereby when the box is tilted endwise the said overhanging portion will serve as a baffle to prevent passage of oil from the reservoir over the inclined surface thereof, and means at the sides of the casing forming oil storage chambers having openings, the bottom walls of said chambers terminating in a plane coincident with the bottom wall of the box and above said reservoir whereby said chambers lie wholly above the top of the reservoir and the openings of said chambers are disposed behind the outer extremity of the portion of the bottom wall overhanging the reservoir.

6. In a tiltable journal box, a box casing formed at its lower outer end with a main oil reservoir, a bottom wall for the casing located above the reservoir and formed centrally thereof and also having a portion overhanging the same, means at the sides of the casing forming auxiliary oil storage chambers, said chambers being disposed at opposite sides of the bottom wall and having their lower wall portions coincident with said bottom wall above the reservoir, the front sides of said chambers being partially open to provide communication between said auxiliary chambers and the main reservoir at a point above said bottom wall of the casing.

7. In a tiltable journal box, a casing having a portion forming an oil reservoir, means forming a pocket to receive oil from the reservoir when the box is tilted, said pocket having an opening located above the oil level of the reservoir, and a baffle wall overlying the reservoir adjacent the pocket and having a lateral edge for directing oil from the reservoir into the pocket.

8. In a tiltable journal box, a casing, a bottom wall for the casing, means below said bottom wall forming a main oil reservoir, and means lying wholly above said bottom wall providing auxiliary pockets to receive oil when the box is tilted, said pockets having openings located above said bottom wall and at the top of said reservoir.

9. A tiltable journal box comprising a casing having a bottom wall, means forming an oil reservoir at one end of the casing below said bottom wall, means forming an oil receiving chamber at the side of the casing, said chamber being closed at its top, sides and inner end and having a bottom wall disposed at an elevation not lower than the top of the reservoir, said chamber further having an outer end wall extending downwardly from the top of said chamber and terminating at its bottom above the bottom wall of the chamber to provide an opening affording communication between the reservoir and the chamber to permit flow of oil from reservoir into the chamber when the box is tilted.

10. A tiltable journal box comprising a casing having a botom wall, means forming an oil reservoir at one end of the casing below said bottom wall, means forming an oil receiving chamber at the side of the casing, said chamber being closed at its top, sides and inner end and having a bottom wall disposed at an elevation not lower than the top of the reservoir, said chamber further having an outer end wall extending downwardly from the top of said chamber and terminating at its bottom above the bottom wall of the chamber to provide an opening affording communication between the reservoir and the chamber to permit flow of oil from the reservoir into the chamber when the box is tilted, and a lip extending outwardly from the inner end wall of the reservoir and overlying the inner end portion of the reservoir, said lip extending inwardly from the inner side wall of the oil chamber.

11. A tiltable journal box comprising a casing having a main bottom wall, said box also having an oil reservoir at one end thereof, the bottom wall of which is disposed below the main bottom wall of the casing, said box further having an oil receiving chamber at each side thereof, each chamber having a front wall, and a bottom wall disposed above the bottom wall of the reservoir and further having in said front wall directly above its bottom wall an oil inlet and outlet opening, said chambers otherwise being completely closed.

12. A tiltable journal box as set forth in claim 11 in which the bottom walls of the chambers are disposed substantially in the same plane as the bottom wall of the casing.

13. A tiltable journal box as set forth in claim 11 in which the bottom wall of the casing between the inner side walls of the chambers extends outwardly beyond the inner end wall of the reservoir.

14. A tiltable journal box as set forth in claim 11 in which a lip extends outwardly from the inner end wall of the reservoir between the inner side walls of the chambers substantially in the plane of the bottom walls of the chambers.

15. A tiltable journal box as set forth in claim 9 in which the inner end wall of the oil receiving chamber is disposed inwardly of the inner end wall of the reservoir.

GEORGES GRANDJEAN.